C. E. PUTMAN.
AUTOMOBILE BED.
APPLICATION FILED MAR. 8, 1919.
1,318,589. Patented Oct. 14, 1919.
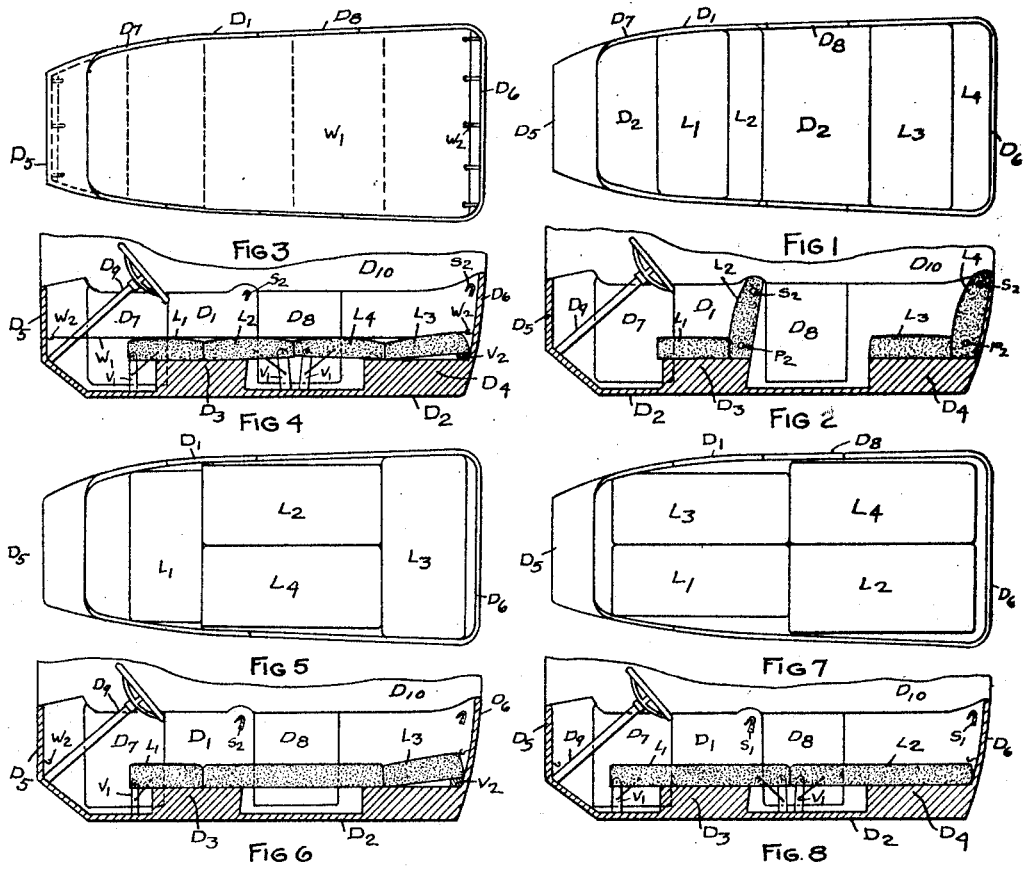
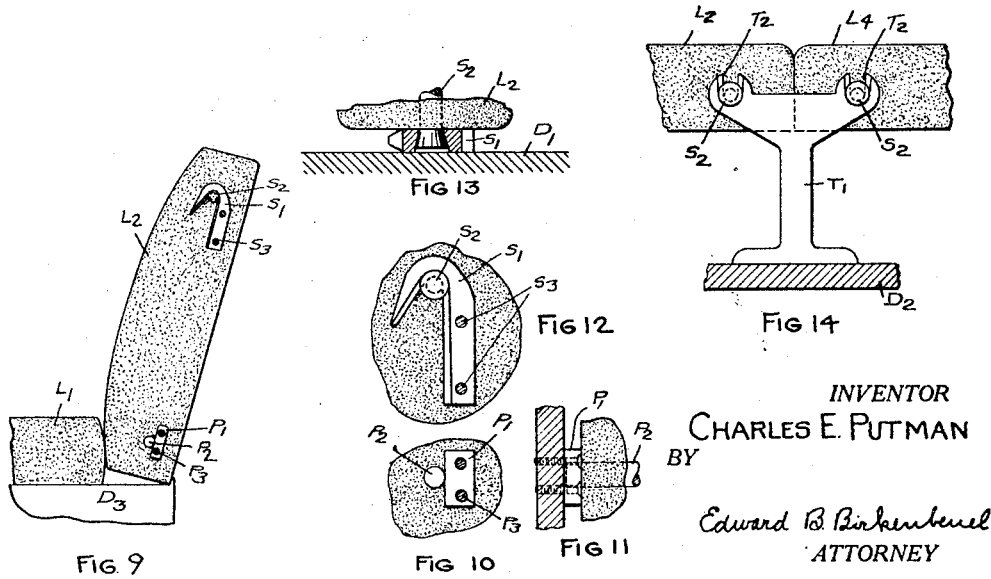
INVENTOR
CHARLES E. PUTMAN
BY
Edward B. Birkenbeuel.
ATTORNEY

UNITED STATES PATENT OFFICE.

CHARLES E. PUTMAN, OF PORTLAND, OREGON.

AUTOMOBILE-BED.

1,318,589.          Specification of Letters Patent.          Patented Oct. 14, 1919.

Application filed March 8, 1919. Serial No. 281,562.

*To all whom it may concern:*

Be it known that I, CHARLES E. PUTMAN, a citizen of the United States, residing at Portland, in the county of Multnomah and State of Oregon, have invented a new and useful Automobile-Bed, of which the following is a specification.

My invention relates more particularly to that class of automobiles which are known as touring cars, but it is evident that it can be used on other types whose internal dimensions are sufficiently large, without departing from the spirit of my invention.

The object of my invention is to utilize the seat cushions and the back cushions of a car in the construction of a bed within the car in a manner to furnish the maximum overhead room and the greatest degree of comfort with the smallest amount of labor being expended to accomplish the conversion from the seat to the bed position of the cushions, and vice versa.

I am aware that attempts have been made to provide a bed within the covering of the automobile by stretching a support above the seat backs both on an independent frame and from the body of the car, but in my device I have availed myself of the cushions of the car to supply comfort to the sleeper, as well as supplying the maximum amount of headroom by the removal of the seat back cushions.

I have arranged the elements of my device in the manner illustrated in the accompanying drawing, which form a part of the specifications following.

Referring to the drawing: Figure 1 is a plan of the body of the car arranged for seating the passengers; Fig. 2 is a sectional elevation showing the relation of the cushions as arranged in Fig. 1; Fig. 3 is a plan of an arrangement of the cushions when in bed form; Fig. 4 is a sectional elevation of Fig. 3, which arrangement I have designated as the "A arrangement." Figs. 5 and 6 are a plan and a sectional elevation showing a modification of the arrangement of the cushions, which I shall term "Arrangement B"; Figs. 7 and 8 are a second modification of the idea which I shall call "Arrangement C"; Fig. 9 is an enlargement of a seat back cushion showing its securing means; Fig. 10 is an enlargement of the stop for the lower end of the seat back; Fig. 11 shows an end elevation of Fig. 10; Fig. 12 is an elevation of one of the means for securing the upper portion of the seat, as well as bracing the sides of the car body; Fig. 13 is a plan of Fig. 12; Fig. 14 is a detail showing a means of uniting and supporting the cushions between the front and rear seat benches.

Similar letters and numbers of reference refer to the same or similar parts throughout the several views.

Referring in detail to the drawing, $D^1$ represents the side of a car body of which $D^2$ is the floor and $D^3$ the bench on which the forward seat cushion is placed. $D^4$ is the bench upon which the rear seat cushion is placed. $D^5$ is the dash and $D^6$ the rear wall. $D^7$ and $D^8$ are the front and rear doors respectively. $D^9$ is the usual steering wheel and $D^{10}$ the top.

$L^1$ is the forward seat cushion which rests on the bench $D^3$. $L^2$ is the forward back cushion which is incorporated in the back of the forward seat. $L^3$ is the rear seat cushion which rests upon the rear seat bench $D^4$. $L^4$ is the rear back cushion which normally rests against the rear wall $D^6$.

The lower edge of the removable seat back cushions $L^2$ and $L^4$ is prevented from moving forward when once in place by the respective seat cushions, and is prevented from moving backward by the positioning stop $P^1$, which is secured to the inside of the car body and which engages the position stop pin $P^2$, the positioning stop $P^1$ being secured to the body side $D^1$ by the bolts $P^3$, and the position stop pins $P^2$ being securely fastened to the frame of the cushion backs.

At each upper end of the back cushions is a securing pin $S^2$ which is also secured to the cushion frame and is arranged to seat itself in the securing hook $S^1$, which is fastened to the inside of the body by the bolts $S^3$.

The cushion cover $W^1$ is arranged to cover the entire surface of the bed being secured to the rear wall $D^6$ and stretched to the dash $D^5$ so that it will form an extension over the edge of the foremost cushion.

$T^1$ is a double notched standard for supporting and uniting cushions when they meet between the forward seat bench and the rear seat bench.

$V^1$ is a folding leg such as is in common use in collapsible articles of manufacture and it requires no further description.

It is evident that any means may be employed to support the free ends of a cushion which project beyond either of the seat benches, without departing from the spirit of my invention.

$V^2$ is a support for the rearmost cushion when it is desired to elevate same for the purpose of forming a pillow, which may consist of a piece of wood, spare bedding, or short legs as indicated by $V^1$.

It will be observed in the various forms of my invention that I have preserved the one idea of utilizing the backs and cushions of the seats to form a continuous bed at a height which will insure the greatest freedom of action and accessibility. In Figs. 1 and 2 the outward appearance of the body does not differ materially from many of the models now in use. In Fig. 4 it will be seen that by moving the forward seat cushions $L^1$ toward the front of the car and moving the bottom of the forward back cushions $L^2$ in the same direction that the securing pins $S^2$ will move downward and out of the securing hook $S^1$, and the forward back cushion $L^2$ will be free to drop down so that what was normally its lower edge will now touch the cushion $L^1$, while the portion which was normally its upper edge will be near the center of the rear doors and will be supported in that position by a double notched standard $T^1$ whose notches $T^2$ will engage the pins $S^2$ of the forward back cushion. Into the second notch $T^2$ is placed the pin $S^2$ of the rear back cushion, which has been lowered out of place in the same manner as was the forward back cushion $L^2$, and the rearward end of the rear back cushion $L^4$ is now resting on the bench $D^4$.

It will be seen that the cushions $L^2$ and $L^4$ are held firmly together by the standard $T^1$. A canvas cushion cover $W^1$ is now attached to the hooks $W^2$ at the rear wall $D^6$ and rolled forward over the cushions which now form the mattress of the bed, and hooked to corresponding hooks $W^2$ in the dash $D^5$. The required slots are cut into the forward end of the cover $W^1$ to accommodate the steering post, levers, etc.

It will be noticed that under the rearward end of the cushion $L^3$ I have placed an elevating block which will slightly raise the pillow end of the bed, which may vary to suit the individual requirements. The cushion serves to prevent the bedding from being soiled by cushion dust and serves as an extension to the foot of the bed. It will also be a convenient cover for the bedding en route.

The forward end of the cushion $L^1$ is supported by an ordinary folding leg $V^1$, as may be the adjacent sides of the cushions $L^2$ and $L^4$ in Figs. 4 and 8, or by any other means, without departing from the spirit of my invention. I have chosen the form shown as $T^1$ on account of its simplicity and the union it forms between the back cushions $L^2$ and $L^4$.

The modification "B" which I have illustrated by Figs. 5 and 6 is the same as in Figs. 3 and 4, except that the back cushions $L^2$ and $L^4$ are turned longitudinally and thereby bridge the gap between the forward and the rear seat benches $D^3$ and $D^4$ and do not require any additional support. The forward end of the cushion $L^1$ is supported as shown in each of the modifications of the idea.

A still further modification "C" which is shown in Figs. 7 and 8 requires the two narrower cushions $L^1$ and $L^3$ to be turned parallel with the length of the car and placed upon the forward seat bench $D^3$, while the back cushions $L^2$ and $L^4$ are placed in similar position upon the rear seat bench $D^4$, as shown in Fig. 7. Here, however, I support the cushions between the seat benches as well as at the forward end of the forward pair of cushions.

In each case the cushion cover $W^1$ may be used if desired with the corresponding beneficial results. To overcome what might appear to be a weakness of the body caused by the separation of the sides $D^1$ by the removal of the forward back cushion I have constructed my device as is detailed in Figs. 9 to 13 inclusive. In Fig. 9 it is shown that the position stop pin $P^2$ rests against the stop $P^1$ which is fastened to the side of the body $D^1$, while the securing pin $S^2$ is lodged in the closed end of the securing hook $S^1$ which is also secured to the side of the body $D^1$. It may be seen in Fig. 13 that the pin $S^2$ has a head which resembles the head of a flat-headed screw and is greatest in diameter at the outward end of the pin. The securing hook $S^1$ is shaped so that once the head of the pin $S^2$ enters the narrow portion of the hook $S^1$ it is able to resist any lateral tension or compression thrusts. There being a similar arrangement at each end of both the front and rear seats it will be seen that the structure of the body has in no wise been weakened.

The pins $S^2$ have the double function of securing the seats in the upright position and sustaining them in the horizontal position, the inverted position of the hook S¹ insures the back cushion against bouncing out of its seat. The advantages naturally resulting from the use of my device may be briefly stated as follows:

It provides a maximum amount of air and dressing space.

It is not necessary to carry a mattress, a bed frame or a tent.

A very resilient bed is formed by the cushions.

Everything is kept inside of the car, thereby avoiding damage or inconvenience from moisture or loss from oversight or theft.

Salesmen and the traveling public are sure of comfortable sleeping accommodations wherever they may be when they choose to stop for the night, as well as affecting a saving in garage bills.

Location of desirable hotels need not cut down the day's mileage on a tour as one's sleeping quarters are always located at the place he desires to stop, which permits extra touring during the best part of the day.

Overhead room is sufficient for proper and convenient care of clothing.

Exposure to fire loss is reduced and privacy for the occupants is guaranteed.

While I have thus described my invention, it is not my desire to limit myself to this precise form or method of application of my device, but intend that it shall cover all forms and modifications of same that fall fairly within the appended claims.

What I claim as new and desire to protect by Letters Patent of the United States, is:

1. In an automobile bed, the combination of a slidable forward seat cushion adapted to be supported forward of its normal position, a removable forward seat back adapted to bridge the space between the forward and rear seats, a removable rear seat back adapted to bridge the space between the forward and rear seats, and a sliding rear seat cushion adapted to occupy the space previously used by the lower portion of the rear seat back and form a ledge for the rear end of the space bridging cushions.

2. In an automobile bed, the combination of a slidable forward seat cushion adapted to be supported forward of its normal position, a removable forward seat back adapted to bridge the space between the forward and rear seats, a removable rear seat back adapted to bridge the space between the forward and rear seats, a sliding rear seat cushion adapted to occupy the space previously used by the lower portion of the rear seat back and form a ledge for the rear end of the space bridging cushions, and a means for bracing the sides of the car consisting of headed studs projecting from the sides of the forward seat back and engaging behind hooks secured to the side walls of the car.

CHARLES E. PUTMAN.

Copies of this patent may be obtained for five cents each, by addressing the "Commissioner of Patents, Washington, D. C."